United States Patent [19]

DeHaan

[11] 4,226,033
[45] Oct. 7, 1980

[54] TREE TRANSPLANTING MACHINE
[75] Inventor: John M. DeHaan, Pella, Iowa
[73] Assignee: Vermeer Manufacturing Co., Pella, Iowa
[21] Appl. No.: 44,530
[22] Filed: Jun. 1, 1979
[51] Int. Cl.³ ............................................. A01G 23/06
[52] U.S. Cl. .................................... 37/2 R; 144/2 N
[58] Field of Search ........................ 37/2 R; 144/2 N
[56] References Cited

U.S. PATENT DOCUMENTS

| | | | |
|---|---|---|---|
| 1,104,535 | 7/1914 | Moore et al. | 144/2 N |
| 1,534,856 | 4/1925 | McKoy et al. | 144/2 N |
| 1,599,841 | 9/1926 | Sager | 37/2 R |
| 2,769,278 | 11/1956 | Wassell et al. | 37/2 R |
| 3,017,707 | 1/1962 | Sigler et al. | 37/2 R |
| 3,191,982 | 6/1965 | Goalard | 37/2 R X |
| 3,364,601 | 1/1968 | Korenek | 37/2 R |
| 3,460,277 | 8/1969 | Grover et al. | 37/2 R |
| 3,589,039 | 6/1971 | Korenek | 37/2 R X |
| 3,618,234 | 11/1971 | Bates | 37/2 R |
| 3,713,234 | 1/1973 | Grover et al. | 37/2 R |
| 3,775,876 | 12/1973 | May | 37/2 R |
| 3,936,960 | 2/1976 | Clegg | 37/2 R |
| 4,031,637 | 6/1977 | Stocker | 37/2 R |

FOREIGN PATENT DOCUMENTS 14100 of 1852 United Kingdom ..................... 37/2 R Primary Examiner—Steven A. Bratlie
Attorney, Agent, or Firm—Rudolph L. Lowell; G. Brian Pingel

[57] ABSTRACT

The split base frame for encircling a tree to be transplanted carries a plurality of upright blade guide units for associated digging blades. Each blade is guidably supported for movement in a guided path from an upper position out of the ground to a lower ground inserted position wherein the blades are inclined downwardly and inwardly of the base frame to relatively converged positions to form a tree ball for the roots of the tree being excavated. A blade is moved by an upright lift screw and nut assembly located in each guide unit and wherein the nut assembly is attached to an associated blade. Coacting means on the nut assembly and on the guide unit define the guided path of movement of the blade with the nut assembly being traversible axially of the screw shaft on rotation thereof by a reversible rotary power means.

6 Claims, 8 Drawing Figures

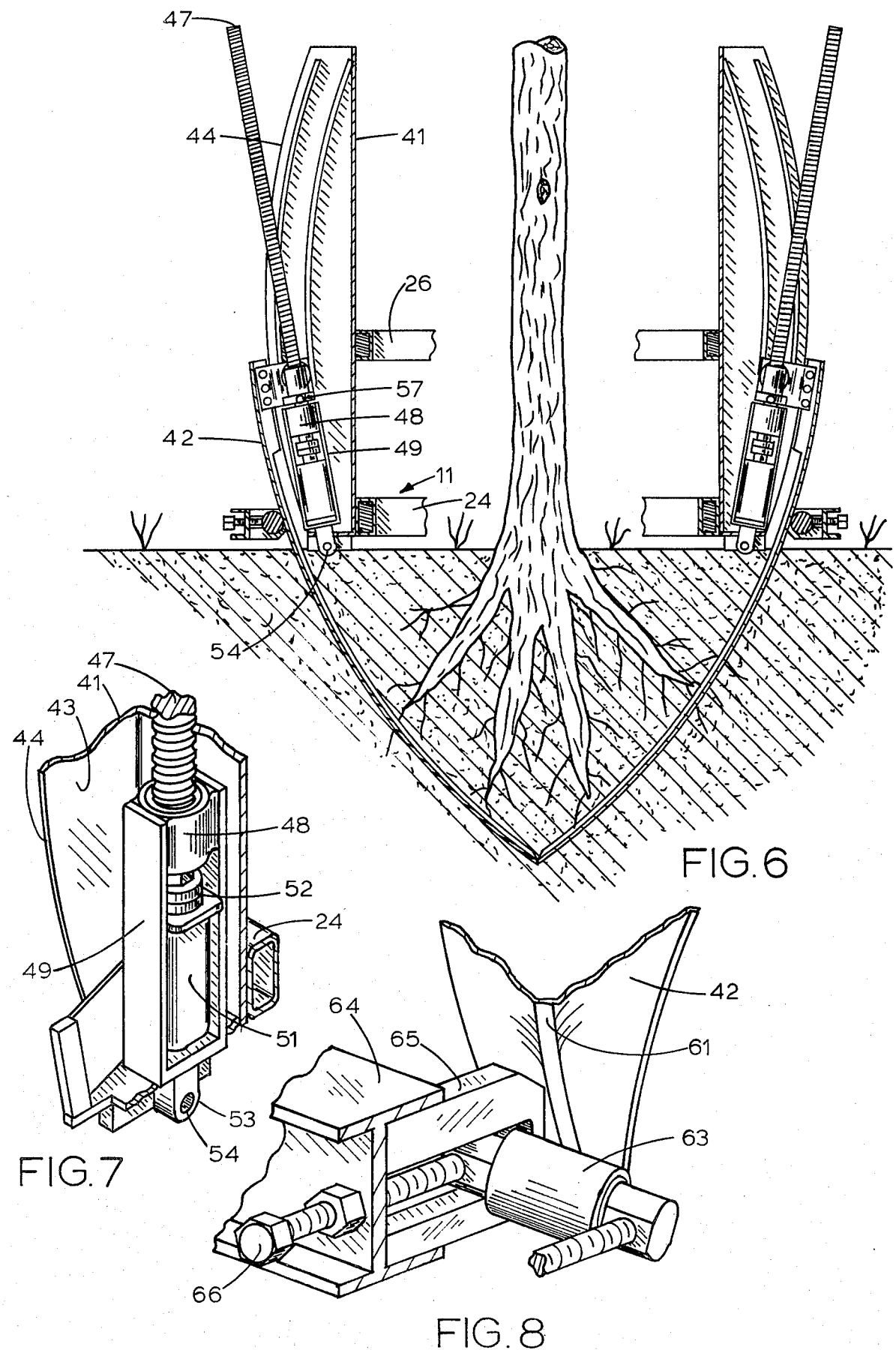

TREE TRANSPLANTING MACHINE

BACKGROUND OF THE INVENTION

The use of digging blades to form a root ball for trees to be excavated is well known as is also the mounting of the blades for an upright guided movement on a split base or ring frame that is adapted to encircle a tree. It is also well known to utilize hydraulic cylinder units for moving the blades. Machines of this general type are exemplified in U.S. Pat. Nos. 1,599,841; 2,769,278; 3,191,982; 3,364,601; 3,618,234; 3,713,234; 3,775,876; 3,936,960 and 4,031,637. These patents also teach the mounting of tree transplanting machines on trucks and like vehicles such that the excavated tree and the machine can be lifted from the ground and then tilted to a convenient position on the vehicle for transport and later placement of the excavated tree in a hole previously prepared by the machine. The transplanting of trees in this manner has been highly successful.

It is now a rather common practice to transplant trees of a relatively large size, i.e. trees having trunk diameters of from six to ten inches. These size trees create problems in maintaining the machine within dimensions for normal highway travel when mounted on a truck and in the construction of the machine for operation in a clearance relation with low tree branches which occur most often in the handling of coniferous type trees.

In the machines of the above referred to patents, the digging blades are moved by hydraulic cylinder assemblies so that the range of movement of a blade is limited to the piston stroke. A cylinder assembly is thus relatively bulky and required an overall vertical height that is equal substantially to twice the length of the piston stroke. This objection was corrected in part by the hydraulic cylinder and blade assembly of U.S. Pat. No. 4,031,637 wherein the blade travels in a two to one ratio relative to the travel of the piston rod. However, in all of the above patents, it will be seen that hydraulic cylinder units are used for operating the digging blades for the reason that an efficient ground penetration of the blades was believed to require not only their separate operation, but also that ground penetration was facilitated by a reciprocating or bouncing action of the blade during the ground inserting operation.

BRIEF SUMMARY OF THE INVENTION

The machine is of a compact construction within dimensional confines providing for a usual highway travel in the transport of excavated trees, is economical in cost, and is efficient in operation to excavate trees of relatively large size without damage, from obstructing machine parts. A split base frame for encircling a tree carries a plurality of upright blade guide units each of which is of a general channel shape in transverse cross section and faced outwardly. An upright lift screw within each guide unit has a lower end portion supported on the base frame for rotational movement and for pivotal movement in a plane extended laterally of the guide unit. The lift screw is reversely rotated to provide for the axial travel thereon of a blade moving nut assembly that is connected to the upper portion of a digger blade positioned adjacent to the open or outer side of the guide unit. Rollers on the nut assembly coact with tracks within the guide unit to provide for reciprocal movement of a digger blade in a guided path between an upper position out of the ground and a lower ground inserted position wherein the blades are relatively converged to define the root ball of the tree to be excavated. Rotation of each lift screw by a reversible rotary hydraulic motor coupled to the lower end of the lift screw provides for a selective constant applied pressure on the digger blades during ground penetration. The application of a digging pressure on a blade through the action of a lift screw eliminates the usual bounce action of a hydraulic cylinder assembly whereby ground penetration is not only facilitated but unnecessary stress on the machine is eliminated.

DESCRIPTION OF THE DRAWING

FIG. 6 is illustrated similarly to FIG. 5 and shows the blades in their lowermost converged positions defining the root ball of the tree to be excavated;

FIG. 7 is a detail perspective view showing the assembly of the lower end of a blade lift screw with a supporting bearing and drive motor therefor; and FIG. 8 is a detail perspective view of a guide roller for holding a blade against lateral movement from a guided path of travel therefor.

DETAILED DESCRIPTION OF THE INVENTION

Figure 1:
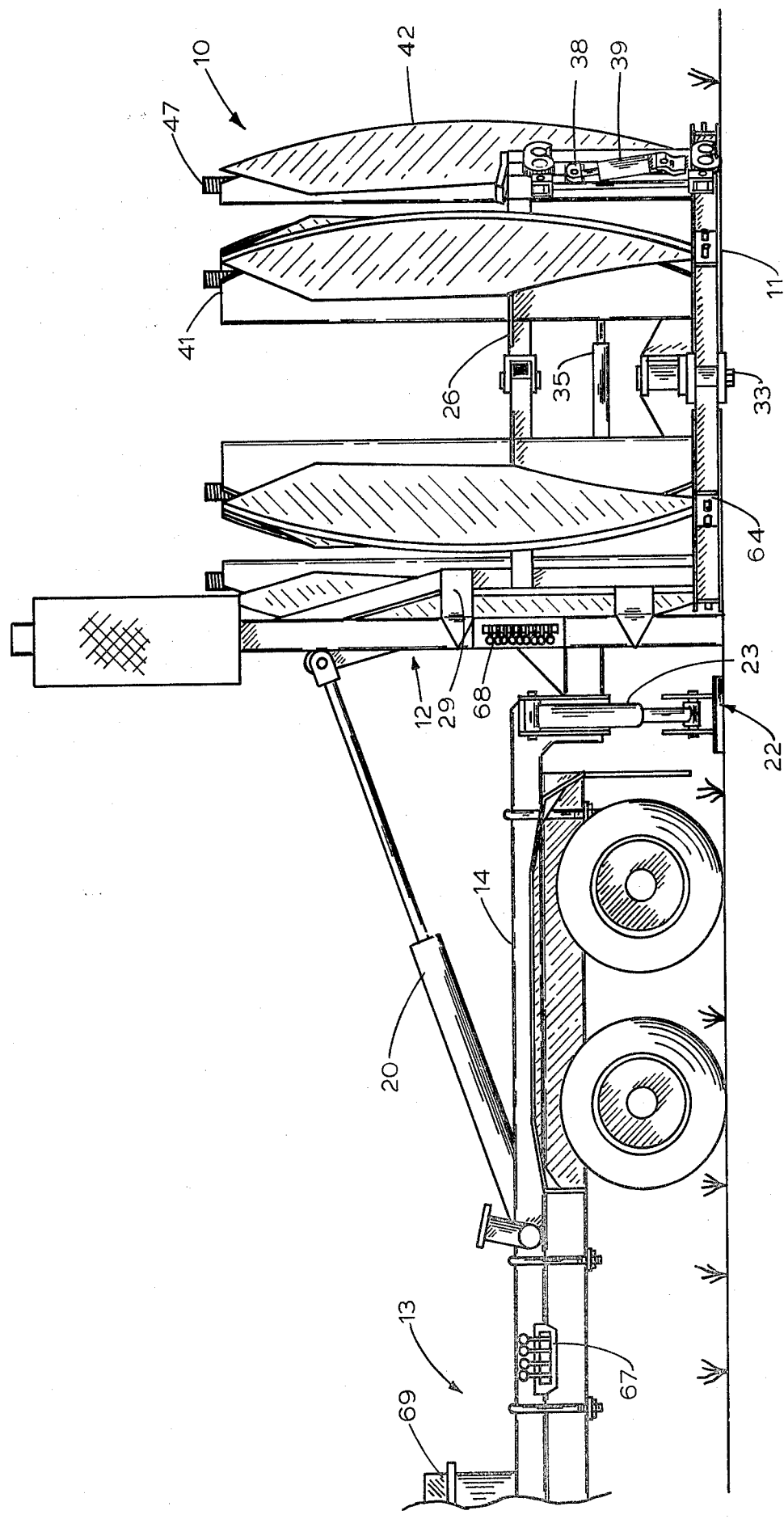
FIG. 1 is a side elevational view of the tree transplanting machine of this invention in assembly relation with the rear end portion of a vehicle, showing the position of the machine parts at the start of a digging operation.
Figure 4:
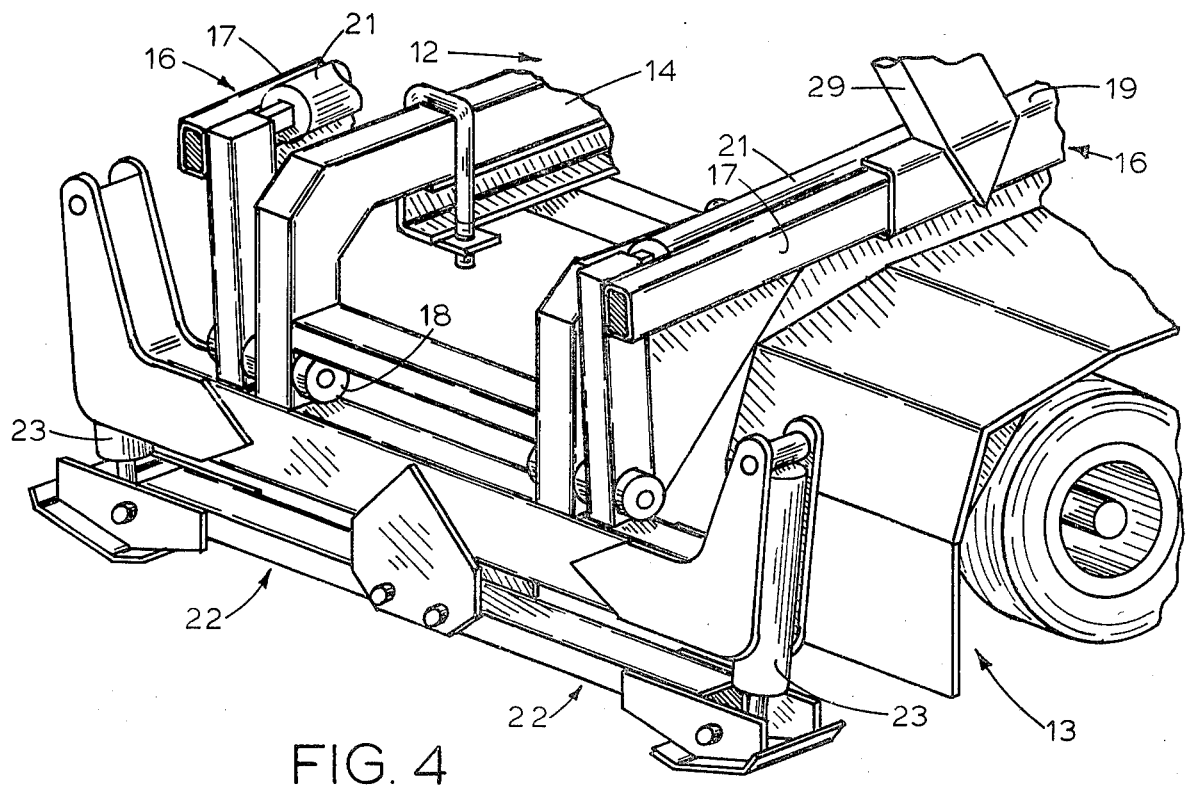
FIG. 4 is an enlarged detail perspective view showing the assembly of the rear portion of a vehicle with the mounting frame of the machine and wherein the mounting frame is illustrated in its transport position on the vehicle.

Referring to FIG. 1, the tree transplanting machine of this invention, indicated at 10, is illustrated as including a base frame 11 of a ring shape for encircling a tree to be excavated, and a mounting frame 12 secured to the base frame 11 and pivotally supported on the rear end of a vehicle 13 such as a truck having a chassis 14. The mounting frame 12 and base frame 11 are arranged normal to each other, with the mounting frame being tiltable from a horizontal transport position (FIG. 4) to an upright position (FIG. 1) wherein the base frame 11 is supported on the ground surface. The mounting frame 12 has side members 16 of a telescopic construction (FIG. 4) each of which has a leg section 17 pivotally connected at 18 to the vehicle chassis 14 and extensible sections 19 secured to the base frame 11. The tilting movement of the mounting frame 12 between the positions therefor shown in FIGS. 1 and 4, is provided by a pair of hydraulic cylinder units 20 (only one of which is shown) interconnected to and extended between an extensible section 19 and the vehicle chassis 14. The sections 19 are extended and retracted relative to the leg sections 17 by hydraulic cylinder units 21

(FIG. 4). The machine 10 in the digging position therefor is stabilized against movement laterally of the vehicle 13 by outrigger structures 22 carried on the vehicle and actuated by hydraulic cylinder units 23.

The base frame 11 (FIGS. 1 and 2) is of a generally ring shape and includes a lower ring member 24 and an upper ring member 26. A main or front ring section, indicated generally as 28 has a generally semicircular shape, opens rearwardly relative to the vehicle 13, and is connected by members 29 to the extensible leg sections 19 of the mounting frame 12. A pair of rear ring sections 31 and 32 are hingedly connected at 33 and 34, respectively, to the rear ends of the front ring section 28 for pivotal movement to open and closed positions relative to the front ring section 28. The rear ring sections are pivotally moved by hydraulic cylinder assemblies 35 and 37, respectively, relative to the front ring section 28 and are releasably locked together in the closing positions therefor by a locking unit 38 (FIGS. 1 and 2) operated by a hydraulic cylinder unit 39.

Mounted on the base frame 11 and interconnecting the lower ring 24 and upper ring 26 are a plurality of circumferentially spaced upright blade guide units 41 illustrated as six in number. Since each guide unit 41 is of a like construction and assembled in a like manner, with an associated digging blade 42, only one of such assemblies will be described in detail with like numerals being used to designate like parts.

A guide unit 41 (FIGS. 2 and 3) is of a generally channel shape in transverse cross section having the open side thereof faced outwardly. The leg sections 43 of the units 41 have outer edges 44 of a generally arcuate contour bowed outwardly over the complete lengths thereof. The inner surface of each leg member 43 is provided with a pair of track members 46 of an arcuate shape corresponding to the curvature of the outer edges 44 of the legs 43.

Located within a guide unit 41 is an upright lift screw 47 of a length axially substantially coextensive with the height of the guide unit. The lower end portion of the lift screw is mounted for rotation in a thrust bearing 48 (FIGS. 6 and 7) carried within and adjacent to the upper end of an upright U-shaped bracket 49 in the lower end of which is mounted a hydraulic motor 51. The lift screw is connected in a direct driven relation with the hydraulic motor 51 by a coupling assembly 52. The base or lower end 53 of the bracket 49 is pivotally connected at 54 to the lower ring section 24 of the base frame 11. The lift screw 47 is thus rotatably supported for rotational movement about an upright axis and for pivotal movement laterally of the guide unit 41 for a purpose to appear later.

Figures 2, 3:
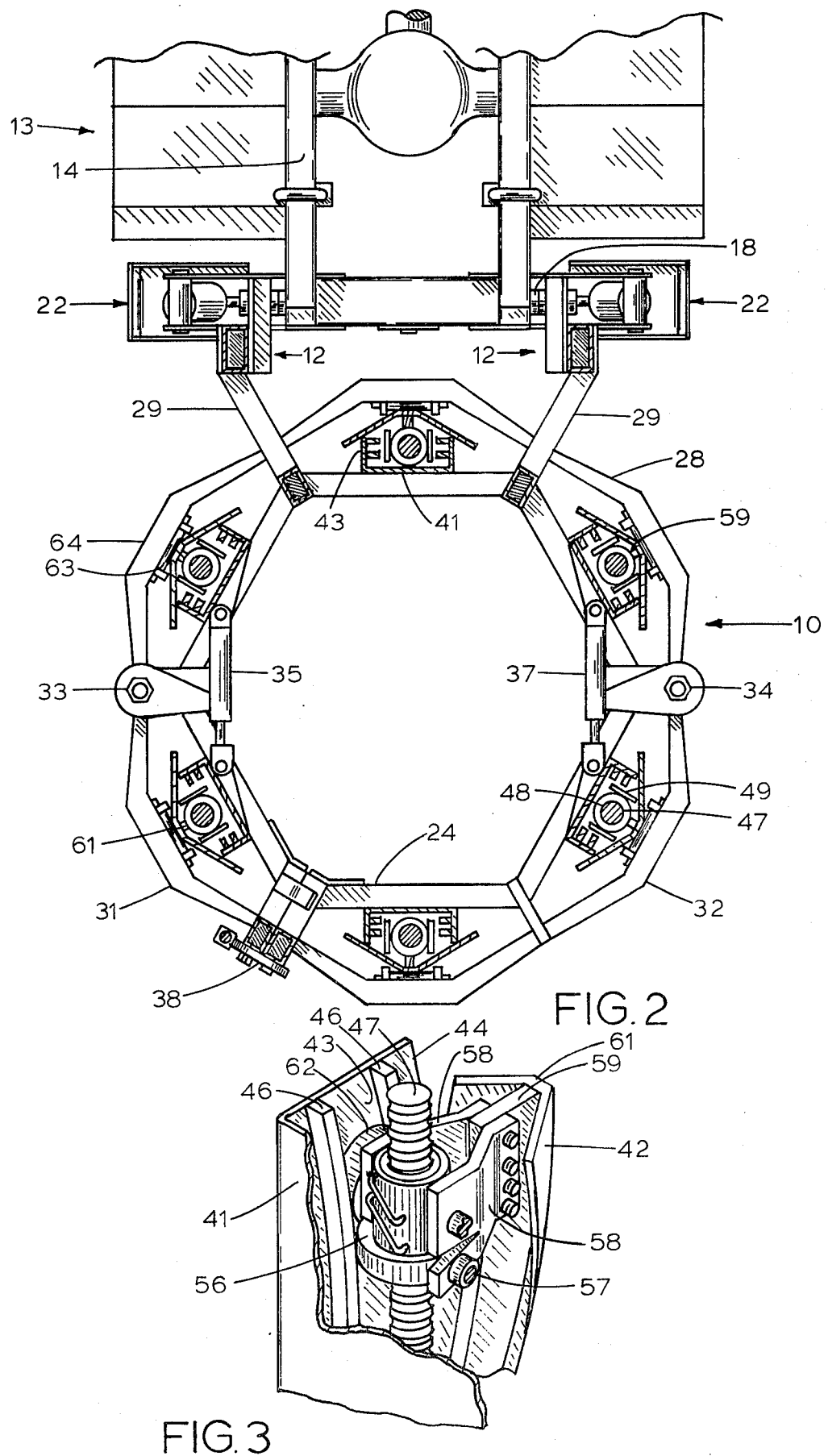
FIG. 2 is an enlarged plan view of the assembly in FIG. 1 showing the base frame with parts removed and other parts in section for the purpose of clarity.
FIG. 3 is an enlarged detail perspective view, with parts broken away and other parts shown in section, showing the connection of a digging blade with a blade moving nut assembly.

Traversible axially of a lift screw 47 in response to a rotation thereof is a blade moving unit or nut assembly 56 of a usual ball bearing type (FIG. 3) wherein ball members (not shown) are confined in the nut assembly for travel in the externally threaded surface of the lift screw. This nut assembly 56 is provided with a pair of diametrically opposed stub shafts 57 which form a trunion for pivotal connection with one of the ends of a pair of connecting members 58, the opposite ends of which are secured to a center rib 59 of a digging blade 42 (FIG. 3).

Each digging blade 42 is of a generally triangular shape in transverse cross section (FIG. 2) and has an apex portion 61 faced outwardly. The center rib 59 is carried on the inner surface of a digging blade at the apex 61. A blade 42 is of a length substantially equal to the height of a guide unit 41 and when out of the ground is positioned adjacent a guide unit with the center rib 59 open to the lift screw 47. Each digging blade is of a bow shape longitudinally thereof and the side portions thereof converge downwardly of a blade so as to form what might be termed a digging point at the lower end thereof. The converging sides of the digger blades are of a contour such that the blades, in their lowermost ground inserted positions, form a substantially continuous wall which defines the size of the root ball of a tree being excavated and constitute a container for such ball in the transport of the tree being transplanted.

In its digging or ground penetrating operation, a blade 42 is confined for movement in a guided path by means including a roller 62 rotatably mounted on each connecting member 58 adjacent the pivotal connection 57 therefor. The rollers 62 are in axial alignment and arranged to opposite sides of a lift screw 47 for coacting riding engagement within associated adjacent tracks 46 on the side legs 43 of a guide unit 41. In the traverse of the nut assembly 56, along the lift screw 47, the connecting members 58 are movable up and down within the outer open side of the guide unit 41. It is seen, therefor, that the movement of the upper portion of a digging blade 42 follows an arcuate path determined by the contour of the tracks 46.

Figure 5:
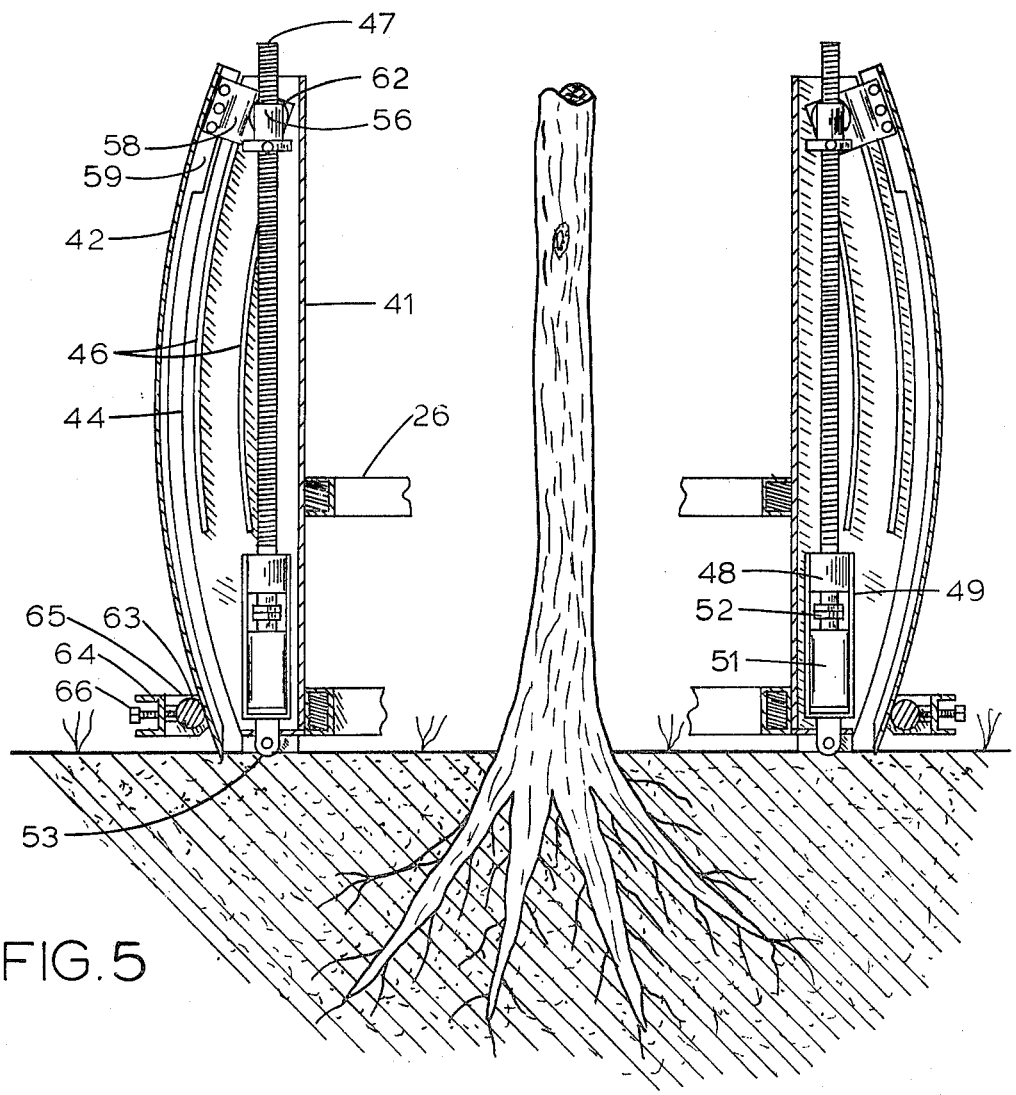
FIG. 5 is a vertical sectional view through a pair of diametrically opposed guide unit and blade assemblies showing the blades in position for ground penetration.

This guided movement of a blade 42 downardly to a lowermost position into a contiguous relation with adjacent blades is maintained by a guide roller 63 rotatably supported in a mounting frame 64 carried on the lower ring section 24 of the base frame 11 for engagement with the apex portion 51 of a digging blade 42. As best shown in FIG. 8, the guide roller 63 is mounted on a sliding bearing 65 for adjustable movement laterally of a blade 42 by adjusting screws 66. During the guided movement of a blade 42, the lift screw 47 is pivotally movable about the pivot 54 from its substantially vertical position shown in FIG. 5, at the beginning of a digging operation, to its outwardly inclined position shown in FIG. 6, at the completion of a digging operation. The roller 63 is at all times in engagement with the apex portion 61 of a blade 42 and, as shown in FIG. 2, inward lateral movement of a blade 42 may be limited by the engagement of the blade with the arcuate edges 44 of the guide unit legs 43.

In the operation of the machine to transplant a tree, the truck 13, with the machine 10 carried rearwardly in an upright position thereon, is backed up to a position adjacent the tree to be transplanted for reception of the tree within the base frame 11 on opening of the rear ring sections 31 and 32. With the tree disposed substantially centrally of the base frame 11 the ring rear sections 31 and 32 are closed and locked together by the locking unit 38. The machine is then manipulated to a stable ground supported position on the base frame 11 which is maintained by the hydraulic cylinder assemblies 21 applying a rearward force on the mounting frame 12, and by the relative adjustment of the outrigger structures 22.

Oil under pressure is selectively supplied to the various hydraulic cylinder assemblies from a pump and reservoir unit 69 carried on the truck 13 for operation from the truck engine (not shown). A control unit 67 (FIG. 1) on the truck controls the operation of the mounting frame cylinder units 20, the cylinder units 21 for the leg sections 19, and the outrigger cylinder units 23. A second control unit 68 is carried on the mounting frame 12 at a position for ready access by the machine operator and for his observation of the digging action of the blades 42. The hydraulic motors 51 are separately controlled so that the digging blades 42 can be inserted into the ground in any desired manner to facilitate their penetration to the lowermost positions therefor.

On completion of the digging operation, the extensible leg sections 19 of the mounting frame 12 are extended from the leg sections 17 relative to the tilting of the mounting frame 12 by the cylinder units 20 to lift the base frame 11 to a position wherein the extended blades 42 are in a clearance relation with the rim of the hole left by the tree being removed. A relative manipulation of the cylinder units 20 and 21 is then continued until the frame 12 is in a substantially horizontal position on the truck chassis 14 corresponding to the transport position of the machine 10 and the tree to be transplanted. The outrigger structures 22 are then actuated to their normal or rest positions.

Although the invention has been described with respect to a preferred embodiment thereof, it is to be understood that it is not to be so limited since changes and modifications can be made therein which are within the full intended scope of this invention as defined by the appended claims.

I claim:

1. A machine for excavating a tree from the ground with a root ball including:
   (a) a base frame for encircling a tree to be excavated;
   (b) a plurality of upright blade guide units on said base frame;
   (c) a plurality of movable digging blades corresponding in number to said guide units, with each blade movable in a guided path adjacent to and outwardly from an associated guide unit;
   (d) means for guidably supporting a blade for movement in said guided path from an upper position out of the ground, to a lower ground inserted position wherein said blades are inclined downwardly and inwardly of said base frame to form a tree ball for the roots of a tree being excavated;
   (e) means for moving each blade in the guided path therefor including an upright lift screw and coacting nut assembly, located within each guide unit;
   (f) means supporting the lower end portion of said lift screw on the base frame for rotational movement about an upright axis and for pivotal movement in a plane laterally of a blade;
   (g) means for connecting each nut assembly to the upper end portion of an associated blade;
   (h) coacting means on a guide unit and nut assembly for defining said guided path of movement of a blade; and
   (i) means for reversibly rotating said lift screw.

2. A machine for excavating a tree according to claim 1 wherein:
   (a) said lift screw supporting means includes an upright mounting member;
   (b) a bearing unit adjacent to the upper end of said mounting member, for rotatably supporting the lower end of the lift screw;
   (c) means supporting said reversible rotary means on said mounting member at a position below said bearing unit; and
   (d) means pivotally connecting said mounting member to said base frame for pivotal movement laterally of an associated blade.

3. A machine for excavating a tree according to claim 1 wherein:
   (a) said nut assembly has a pair of diametrically opposed radially projected pivot members for pivotal connection with one end of said connecting means.

4. A machine for excavating a tree according to claim 1 wherein:
   (a) said coacting means includes a pair of transversely opposite rollers mounted on said connecting means, and upright track means within a guide unit in guidable engagement with said rollers.

5. A machine for excavating a tree according to claim 1 wherein:
   (a) each blade is of a generally V-shape in transverse cross section with the apex portion thereof faced outwardly, and
   (b) means for holding each blade against movement laterally of said guided path including a roller mounted on said base frame outwardly of a blade for engagement with the apex portion thereof.

6. A machine according to claim 1 including:
   (a) power means for lifting said machine and excavated tree from the ground.

* * * * *